(12) United States Patent
Jiang et al.

(10) Patent No.: US 12,675,876 B2
(45) Date of Patent: Jul. 7, 2026

(54) THREE-DIMENSIONAL MEDICAL IMAGE RECOGNITION METHOD AND APPARATUS, DEVICE, STORAGE MEDIUM, AND PRODUCT

(71) Applicant: Tencent Technology (Shenzhen) Company Limited, Guangdong (CN)

(72) Inventors: Cheng Jiang, Shenzhen (CN); Jianye Pang, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 305 days.

(21) Appl. No.: 18/377,958

(22) Filed: Oct. 9, 2023

(65) Prior Publication Data

US 2024/0046471 A1 Feb. 8, 2024

Related U.S. Application Data

(63) Continuation of application No. PCT/CN2022/139576, filed on Dec. 16, 2022.

(30) Foreign Application Priority Data

Feb. 28, 2022 (CN) .......................... 202210191770.3

(51) Int. Cl.
*G06T 7/00* (2017.01)
*G06T 3/40* (2024.01)
(Continued)

(52) U.S. Cl.
CPC .............. *G06T 7/0012* (2013.01); *G06T 3/40* (2013.01); *G06T 15/00* (2013.01); *G06V 10/44* (2022.01);
(Continued)

(58) Field of Classification Search
CPC ......... G06T 7/0012; G06T 3/40; G06T 15/00; G06T 2207/10081; G06T 2207/10088;
(Continued)

(56) References Cited

U.S. PATENT DOCUMENTS 8,351,672 B2 1/2013 Tao et al.
10,896,504 B2 * 1/2021 Yaguchi ................ G06T 7/0012
(Continued)

FOREIGN PATENT DOCUMENTS

CN 109446951 A 3/2019
CN 109903292 A 6/2019
(Continued)

OTHER PUBLICATIONS

Sheng; Lan et al. "DRT: Deformable Region-Based Transformer for Nonrigid Medical Image Registration With a Constraint of Orientation", Jan. 2023, IEEE (Year: 2023).*
(Continued)

*Primary Examiner* — John Villecco
*Assistant Examiner* — Alejandro Hernandez
(74) *Attorney, Agent, or Firm* — Crowell & Moring LLP

(57) ABSTRACT

A 3D medical image recognition method and apparatus, a device, a non-transitory computer-readable storage medium, and a computer program product are provided, which relate to the field of artificial intelligence. View rearrangement processing is performed in an $i^{th}$-round feature extraction process on an $(i-1)^{th}$-round 3D medical image feature to obtain 2D image features. The $(i-1)^{th}$-round 3D medical image feature is obtained by performing $(i-1)^{th}$-round feature extraction on a 3D medical image. Different 2D image features are features of the $(i-1)^{th}$-round 3D medical image feature in different views. Semantic feature extraction processing is performed on each 2D image feature in different views. Feature fusion processing is performed on the image
(Continued)

semantic features to obtain an $i^{th}$-round 3D medical image feature. Image recognition processing is performed on an $I^{th}$-round 3D medical image feature obtained through $I^{th}$-round feature extraction to obtain image recognition of the 3D medical image.

14 Claims, 8 Drawing Sheets

(51) Int. Cl.
    *G06T 15/00*     (2011.01)
    *G06V 10/44*     (2022.01)
    *G06V 10/80*     (2022.01)

(52) U.S. Cl.
    CPC .. *G06V 10/806* (2022.01); *G06T 2207/10081* (2013.01); *G06T 2207/10088* (2013.01); *G06T 2207/10104* (2013.01)

(58) Field of Classification Search
    CPC ............. G06T 2207/10104; G06T 7/73; G06T 7/0002; G06T 3/06; G06T 2207/10072; G06T 2207/20072; G06T 2207/20084; G06T 2207/30004; G06V 10/806; G06V 10/44; G06V 40/10; G06V 10/26; G06V 10/20; G06V 20/647; G06V 2201/03; G06F 18/213; G06F 18/21; G06F 18/253
    See application file for complete search history.

(56) References Cited

U.S. PATENT DOCUMENTS

| | | | |
|---|---|---|---|
| 11,116,579 | B2 | 9/2021 | Mak et al. |
| 11,145,067 | B2 * | 10/2021 | Roy Chowdhury .... G06T 7/194 |
| 11,694,297 | B2 * | 7/2023 | Katouzian ................. G06T 1/20 |
| | | | 382/155 |
| 2009/0080706 | A1 * | 3/2009 | Tao ........................ G06T 7/0004 |
| | | | 382/110 |
| 2016/0155066 | A1 * | 6/2016 | Drame ..................... G06N 3/02 |
| | | | 706/12 |
| 2018/0225823 | A1 * | 8/2018 | Zhou ..................... G06T 7/0012 |
| 2018/0325601 | A1 | 11/2018 | Mak et al. |
| 2018/0330506 | A1 * | 11/2018 | Grady ..................... G06T 7/149 |
| 2019/0392547 | A1 * | 12/2019 | Katouzian ............ G06N 3/0895 |
| 2020/0175677 | A1 * | 6/2020 | Mavroeidis ........... G06T 7/0012 |
| 2020/0226746 | A1 * | 7/2020 | Schwartzbard ...... A61B 5/7267 |
| 2021/0049397 | A1 * | 2/2021 | Chen ...................... G06V 10/82 |
| 2021/0174133 | A1 * | 6/2021 | Nitsch .................. G06V 10/806 |
| 2021/0271847 | A1 * | 9/2021 | Courtiol ................. G06V 10/82 |
| 2022/0214457 | A1 * | 7/2022 | Liang ................... G06F 18/253 |
| 2022/0245424 | A1 * | 8/2022 | Goyal ................... G06F 18/253 |
| 2023/0080098 | A1 * | 3/2023 | He ......................... G06V 10/26 |
| | | | 382/128 |
| 2023/0360776 | A1 * | 11/2023 | Chen ..................... G06T 7/0012 |
| 2024/0005493 | A1 * | 1/2024 | Yerebakan ............ G06T 7/0012 |
| 2024/0020963 | A1 * | 1/2024 | Qian ..................... G06V 10/774 |
| 2024/0412363 | A1 * | 12/2024 | Huet ...................... G06T 7/0012 |
| 2025/0111640 | A1 * | 4/2025 | Abdishektaei ........... G06T 7/11 |
| 2025/0131536 | A1 * | 4/2025 | Hong ..................... G06V 10/30 |
| 2025/0166346 | A1 * | 5/2025 | Tortei .................... G06V 10/74 |
| 2025/0255568 | A1 * | 8/2025 | Jiang ................... A61B 6/5217 |
| 2025/0272801 | A1 * | 8/2025 | Sundaralingam ......... G06T 5/60 |
| 2026/0010746 | A1 * | 1/2026 | Chen .................... G06K 7/1443 |

FOREIGN PATENT DOCUMENTS

| | | | | |
|---|---|---|---|---|
| CN | 110942462 | A | 3/2020 | |
| CN | 111145181 | A | 5/2020 | |
| CN | 112017189 | A | 12/2020 | |
| CN | 112949654 | A | 6/2021 | |
| CN | 112967379 | A | 6/2021 | |
| CN | 113889235 | A | 1/2022 | |
| CN | 113920314 | A | 1/2022 | |
| CN | 114581396 | A | 6/2022 | |
| CN | 120953241 | A * | 11/2025 | ............. G06N 3/082 |
| CN | 121505368 | A * | 2/2026 | |
| EP | 3815617 | A1 * | 5/2021 | ............. G06V 10/42 |
| WO | WO 2021179702 | A1 | 9/2021 | |

OTHER PUBLICATIONS

Japanese-language Office Action issued in Japanese Application No. 2024-531536 dated Mar. 6, 2025 with English translation (7 pages).

Hikari, Jinbo et al.; "Automatic Segmentation of Infant Brain Ventricles with Hydrocephalus in MRI Based on Deep Multi-path Learning", Technical Research Report of the Institute of Electronics, Information and Communication Engineers, 2022, pp. 6-9, vol. 121, No. 347, with English translation of Abstract (6 pages).

Yan, Xiangyi et al.; "AFTer-UNet: Axial Fusion Transformer UNet for Medical Image Segmentation", Winter Conference on Applications of Computer Vision (WACV), Jan. 8, 2022, pp. 3270-3280 (12 pages).

Chinese-language Office Action issued in Chinese Application No. 202210191770.3 dated Jul. 18, 2025, with English translation (17 pages).

Zhi-hong, Rin et al.; "Core technique and design of medical image three-dimensional visualization system", Journal of Clinical Rehabilitative Tissue Engineering Research, Oct. 22, 2010, pp. 8036-8039, vol. 14, No. 43 (4 pages).

International Search Report and Written Opinion issued in PCT Application No. PCT/CN2022/139576 dated May 19, 2023, w/English translation, 16 Pages.

Extended European Search Report issued in European U.S. Appl. No. 22/928,411 dated Jan. 9, 2025, 9 pages.

Rodriguez et al. "Rayburst sampling, an algorithm for automated three-dimensional shape analysis from laser scanning microscopy images" Nature Protocols, vol. 1, No. 4, Nov. 30, 2006, 10 pages.

Heang-Ping et al. "Characterization of masses in digital breast tomosynthesis: Comparison of machine learning in projection views and reconstructed slices" Medical Physics, vol. 37, No. 7, Jun. 15, 2010, 11 pages.

* cited by examiner

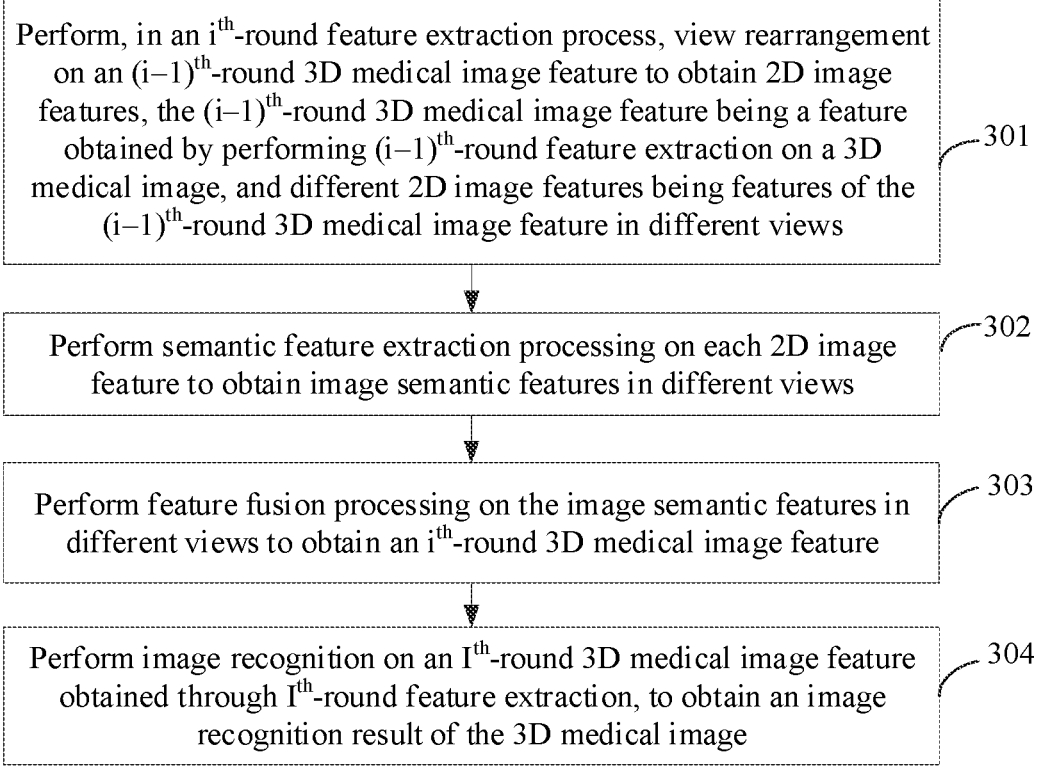

Perform, in an $i^{th}$-round feature extraction process, view rearrangement on an $(i-1)^{th}$-round 3D medical image feature to obtain 2D image features, the $(i-1)^{th}$-round 3D medical image feature being a feature obtained by performing $(i-1)^{th}$-round feature extraction on a 3D medical image, and different 2D image features being features of the $(i-1)^{th}$-round 3D medical image feature in different views — 301

Perform semantic feature extraction processing on each 2D image feature to obtain image semantic features in different views — 302

Perform feature fusion processing on the image semantic features in different views to obtain an $i^{th}$-round 3D medical image feature — 303

Perform image recognition on an $I^{th}$-round 3D medical image feature obtained through $I^{th}$-round feature extraction, to obtain an image recognition result of the 3D medical image — 304

FIG. 3

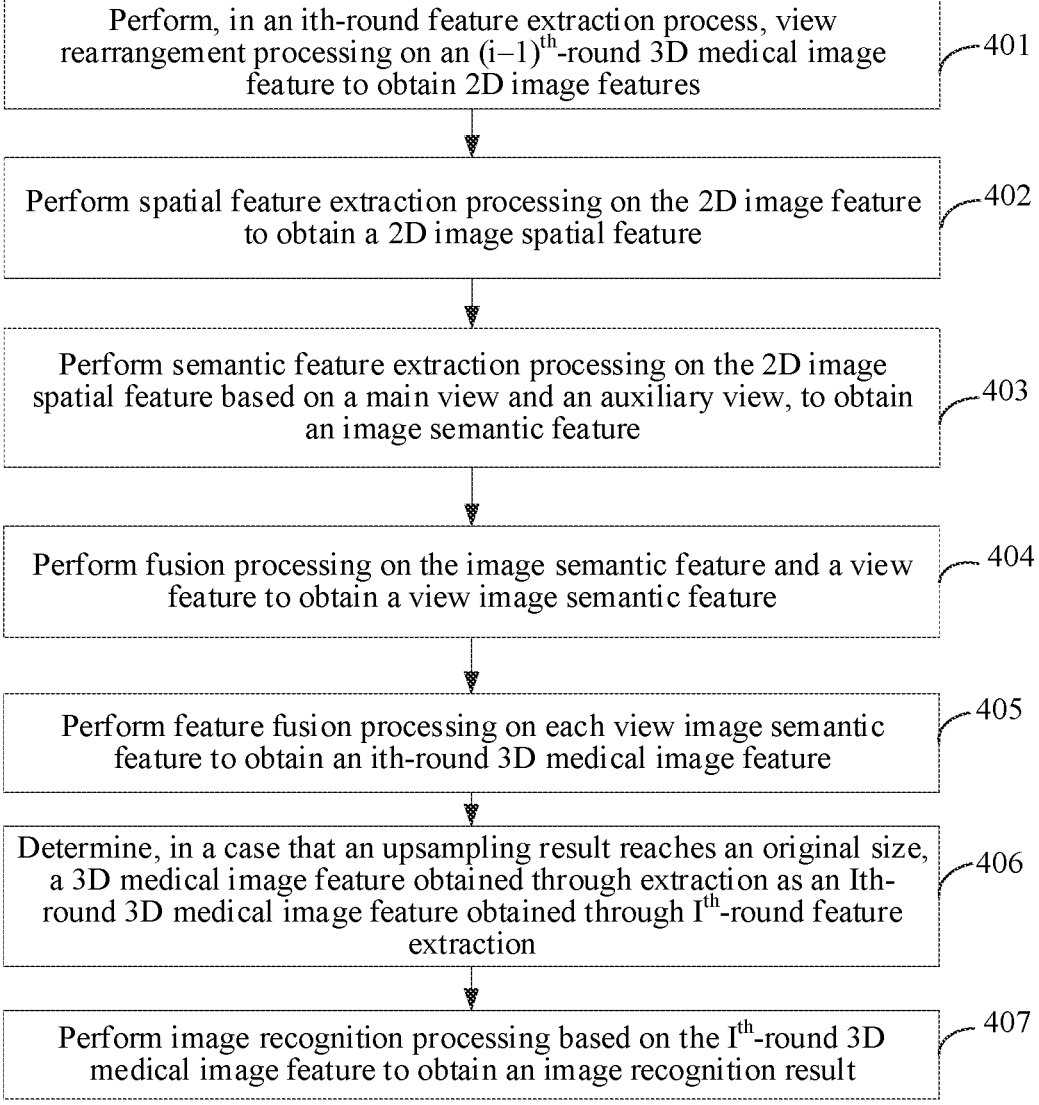

Perform, in an ith-round feature extraction process, view rearrangement processing on an $(i-1)^{th}$-round 3D medical image feature to obtain 2D image features ⟋~401

Perform spatial feature extraction processing on the 2D image feature to obtain a 2D image spatial feature ⟋~402

Perform semantic feature extraction processing on the 2D image spatial feature based on a main view and an auxiliary view, to obtain an image semantic feature ⟋~403

Perform fusion processing on the image semantic feature and a view feature to obtain a view image semantic feature ⟋~404

Perform feature fusion processing on each view image semantic feature to obtain an ith-round 3D medical image feature ⟋~405

Determine, in a case that an upsampling result reaches an original size, a 3D medical image feature obtained through extraction as an Ith-round 3D medical image feature obtained through $I^{th}$-round feature extraction ⟋~406

Perform image recognition processing based on the $I^{th}$-round 3D medical image feature to obtain an image recognition result ⟋~407

FIG. 4

THREE-DIMENSIONAL MEDICAL IMAGE RECOGNITION METHOD AND APPARATUS, DEVICE, STORAGE MEDIUM, AND PRODUCT

RELATED APPLICATION

This application is a continuation of PCT Application PCT/CN2022/139576, filed Dec. 16, 2022, which claims priority to Chinese Patent Application No. 202210191770.3, filed on Feb. 28, 2022. All are hereby incorporated by reference in their entireties.

FIELD OF THE TECHNOLOGY

Examples of this application relate to the field of artificial intelligence, and in particular, to a three-dimensional (3D) medical image recognition method and apparatus, a device, a non-transitory computer-readable storage medium, and a computer program product.

BACKGROUND OF THE DISCLOSURE

In the field of medicine, recognizing a 3D medical image by using a computer vision (CV) technology helps predict a disease condition.

Currently, when the 3D medical image is recognized, image analysis may be performed on the 3D medical image by using a dense prediction method. The dense prediction method is a method of predicting each pixel in the image. In the related art, when dense prediction is performed on the 3D medical image, image recognition is performed based on the entire 3D medical image, to obtain an image recognition result.

However, direct image recognition based on the 3D medical image is large in computation amount and low in recognition efficiency. In addition, a large amount of data is required for pretraining, so that this manner is complex.

SUMMARY

The examples of this application provide a 3D medical image recognition method and apparatus, a device, a non-transitory computer-readable storage medium, and a computer program product, to improve 3D medical image recognition efficiency and reduce computation complexity. The technical solutions are as follows.

An example of this application provides a 3D medical image recognition method, performed by a computer. The method includes:

performing, in an $i^{th}$-round feature extraction process, view rearrangement processing on an $(i-1)^{th}$-round 3D medical image feature to obtain two-dimensional (2D) image features, the $(i-1)^{th}$-round 3D medical image feature is obtained by performing $(i-1)^{th}$-round feature extraction on a 3D medical image, and different 2D image features are features of the $(i-1)^{th}$-round 3D medical image feature in different views;

performing semantic feature extraction processing on each 2D image feature to obtain image semantic features in different views;

performing feature fusion processing on the image semantic features in different views to obtain an $i^{th}$-round 3D medical image feature; and performing image recognition processing on an $I^{th}$-round 3D medical image feature obtained through $I^{th}$-round feature extraction, to obtain an image recognition result of the 3D medical image, i is a positive integer that increases in sequence, $1 < i \le I$, and I is a positive integer.

An example of this application provides a 3D medical image recognition apparatus. The apparatus includes:

a view rearrangement module, configured to perform, in an $i^{th}$-round feature extraction process, view rearrangement processing on an $(i-1)^{th}$-round 3D medical image feature to obtain 2D image features, the $(i-1)^{th}$-round 3D medical image feature is obtained by performing $(i-1)^{th}$-round feature extraction on a 3D medical image, and different 2D image features are features of the $(i-1)^{th}$-round 3D medical image feature in different views;

a feature extraction module, configured to perform semantic feature extraction processing on each 2D image feature to obtain image semantic features in different views;

a feature fusion module, configured to perform feature fusion processing on the image semantic features in different views to obtain an $i^{th}$-round 3D medical image feature; and an image recognition module, configured to perform image recognition processing on an $I^{th}$-round 3D medical image feature obtained through $I^{th}$-round feature extraction, to obtain an image recognition result of the 3D medical image, i is a positive integer that increases in sequence, $1 < i \le I$, and I is a positive integer.

An example of this application provides a computer. The computer includes a processor and a memory. The memory stores at least one instruction, at least one piece of program, a code set, or an instruction set. The at least one instruction, the at least one piece of program, the code set, or the instruction set is loaded and executed by the processor to implement the 3D medical image recognition method as described in the foregoing aspect.

An example of this application provides a non-transitory computer-readable storage medium. The computer-readable storage medium stores at least one instruction, at least one piece of program, a code set, or an instruction set. The at least one instruction, the at least one piece of program, the code set, or the instruction set is loaded and executed by a processor to implement the 3D medical image recognition method as described in the foregoing aspect.

An example of this application provides a computer program product or computer program. The computer program product or computer program includes computer instructions. The computer instructions are stored in a non-transitory computer-readable storage medium. A processor of a computer reads the computer instructions from the computer-readable storage medium. The processor executes the computer instructions to enable the computer to perform the 3D medical image recognition method provided in the foregoing aspect.

The technical solutions provided in the examples of this application have at least the following beneficial effects.

In the examples of this application, in each feature extraction phase, view rearrangement is first performed on a 3D medical image feature, to split the 3D medical image feature into 2D image features in different views, feature extraction is performed on the 2D image features respectively to obtain image semantic features in different views, and the image semantic features in different views are fused to obtain a 3D medical image feature after feature extraction. In this process, feature extraction is performed on the 2D image features in different views, so that compared with the related art in which a 3D image feature is directly extracted for image recognition, in the examples of this application, feature extraction is performed in different views by using a reduced local computation unit. In this way, computation complexity may be reduced. Therefore, 3D medical image recognition efficiency is improved.

BRIEF DESCRIPTION OF THE DRAWINGS

To describe the technical solutions in the examples of this application more clearly, the following briefly describes the accompanying drawings required for describing the examples. It is clear that the accompanying drawings in the following description show merely some examples of this application, and a person of ordinary skill in the art may still derive other drawings from these accompanying drawings without creative efforts.

FIG. 3 is a flowchart of a 3D medical image recognition method according to an example of this application.

FIG. 4 is a flowchart of a 3D medical image recognition method according to an example of this application.

DESCRIPTION OF EMBODIMENTS

Figure 1:
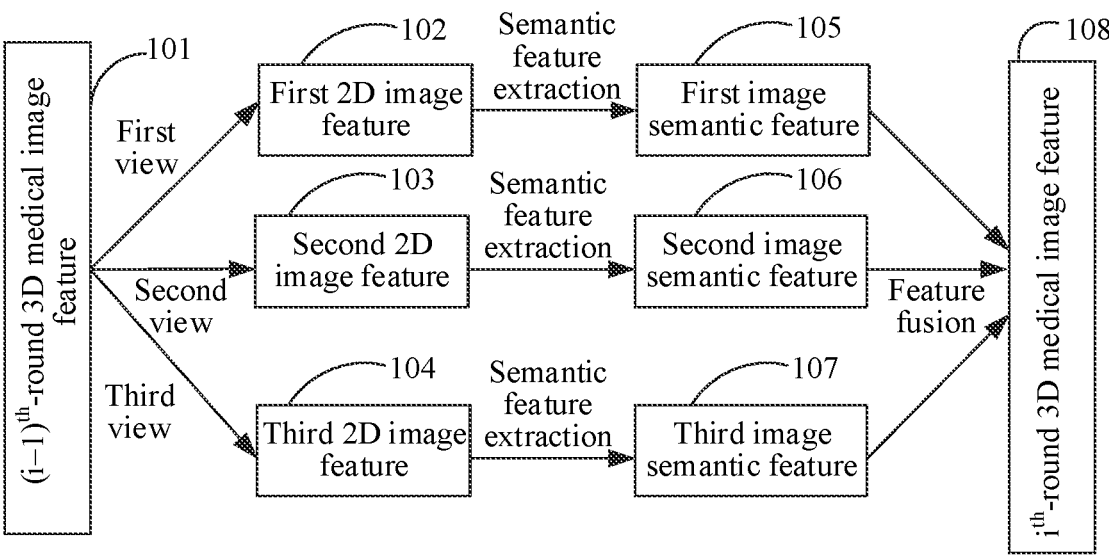
FIG. 1 is a schematic diagram of a principle of a 3D medical image recognition method according to an example of this application.

To make objectives, technical solutions, and advantages of this application clearer, the following further describes implementations of this application in detail with reference to the accompanying drawings.

Artificial intelligence (AI) is a theory, method, technology, and application system of simulating, extending, and developing human intelligence using digital computers or machines controlled by digital computers to perceive environments, acquire knowledge, and obtain optimal results using the knowledge. In other words, AI is a comprehensive technology in computer science and attempts to understand the essence of intelligence and produce a new intelligent machine capable of reacting in a manner similar to human intelligence. AI is to study design principles and implementation methods of various intelligent machines, to endow the machines with functions of perception, reasoning, and decision-making.

The AI technology is a comprehensive discipline, and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions, for example, a CV technology, a voice processing technology, a natural language processing technology, and machine learning/deep learning.

The CV technology is a science that studies how to use a machine to "see", and furthermore, that performs machine vision processing such as recognition and measurement on a target by using a camera and a computer instead of human eyes and further performs graphic processing, so that the computer processes the target into an image more suitable for human eyes to observe or an image transmitted to an instrument for detection. As a scientific discipline, CV studies related theories and technologies and attempts to establish an AI system capable of obtaining information from images or multidimensional data. The CV technology usually includes image processing, image recognition, image segmentation, image semantic understanding, image retrieval, video processing, video semantic understanding, video content/behavior recognition, 3D object reconstruction, a 3D technology, virtual reality, augmented reality, simultaneous localization and mapping, and other technologies, and further includes common biometric feature recognition technologies such as face recognition and fingerprint recognition.

The examples of this application relate to a 3D medical image recognition method, which is an application of the CV technology to the field of image recognition. Feature extraction is performed on 2D image features corresponding to a 3D medical image feature in different views respectively, so that computation complexity may be reduced, and 3D medical image recognition efficiency may be improved.

For example, as shown in FIG. 1, view rearrangement is first performed in an i'-round feature extraction process on an $(i-1)^{th}$-round 3D medical image feature 101 obtained through $(i-1)^{th}$-round feature extraction, to obtain a first 2D image feature 102 in a first view, a second 2D image feature 103 in a second view, and a third 2D image feature 104 in a third view respectively. Semantic feature extraction is performed on the first 2D image feature 102, the second 2D image feature 103, and the third 2D image feature 104 in different views respectively, to obtain a first image semantic feature 105, a second image semantic feature 106, and a third image semantic feature 107. The first image semantic feature 105, the second image semantic feature 106, and the third image semantic feature 107 are fused to obtain an $i^{th}$-round 3D image semantic feature 108.

The 3D medical image feature is decomposed into the 2D image features in different views, and feature extraction is performed on the 2D image features. This helps reduce a computation amount, so that the 3D medical image recognition efficiency is improved.

The method provided in the examples of this application may be applied to an image recognition process of any 3D medical image. For example, a category that each part in the 3D medical image belongs to may be recognized, to assist in focus and organ analysis.

A computer for 3D medical image recognition in the examples of this application may be various types of terminal devices or servers. The server may be an independent physical server, a server cluster or distributed system including a plurality of physical servers, or a cloud server providing a cloud computing service. A terminal may be but is not limited to a smartphone, a tablet computer, a notebook computer, a desktop computer, a smart speaker, or a smartwatch.

The server is used as an example. For example, the server may be a server cluster deployed at a cloud, and exposes an AI as a service (AIaaS) to a user. An AIaaS platform splits several types of common AI services, and provides independent or packaged services at the cloud. Such a service mode is like an AI theme store, and all users may access, through an application programming interface, one or more AI services provided by the AIaaS platform.

For example, one of the AI cloud services may be a 3D medical image recognition service, that is, the server at the cloud is encapsulated with a 3D medical image recognition program provided in the examples of this application. A user invokes the 3D medical image recognition service in the cloud services through a terminal (running a client such as a focus analysis client), so that the server deployed at the cloud invokes the 3D medical image recognition program to decompose a 3D medical image feature into 2D image features in different views, perform feature extraction on the 2D image features, and perform 3D medical image recognition to obtain an image recognition result, to subsequently assist a doctor and a researcher based on the image recognition result in disease diagnosis, subsequent visits, and researches on therapeutic methods, for example, perform auxiliary diagnosis based on an edema index in the image recognition result to determine whether a target object has inflammation, trauma, or allergy, or drinks too much water.

It should be noted that the 3D medical image recognition method provided in the examples of this application does not directly aim to obtain a disease diagnosis result or a health condition, and the disease diagnosis result or the health condition cannot be directly obtained based on the image recognition result, that is, the image recognition result is not directly used for disease diagnosis, and is used only as intermediate data to help predict a disease of a patient and assist the doctor or the researcher in disease diagnosis, subsequent visits, and researches on therapeutic methods.

Figure 2:
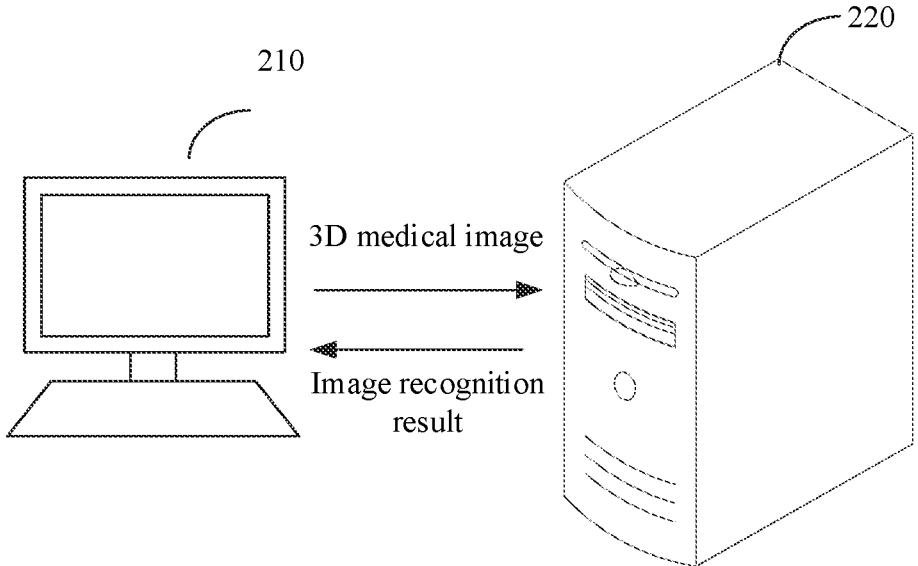
FIG. 2 is a schematic diagram of an implementation environment according to an example of this application.

FIG. 2 is a schematic diagram of an implementation environment according to an example of this application. The implementation environment includes a terminal 210 and a server 220. The terminal 210 performs data communication with the server 220 through a communication network. In some examples, the communication network may be a wired network or a wireless network. The communication network may be at least one of a local area network, a metropolitan area network, and a wide area network.

The terminal 210 is an electronic device running a 3D medical image recognition program. The electronic device may be a smartphone, a tablet computer, a personal computer, or the like. This is not limited in this example of this application. When a 3D medical image needs to be recognized, the 3D medical image is input to the program in the terminal 210. The terminal 210 uploads the 3D medical image to the server 220. The server 220 performs the 3D medical image recognition method provided in the examples of this application to perform image recognition, and feed back an image recognition result to the terminal 210.

The server 220 may be an independent physical server, a server cluster or distributed system including a plurality of physical servers, or a cloud server providing a basic cloud computing service such as a cloud service, a cloud database, cloud computing, a cloud function, cloud storage, a network service, cloud communication, a middleware service, a domain name service, a security service, a content delivery network (CDN), or a big data and AI platform.

In some examples, the server 220 is configured to provide an image recognition service for an application installed in the terminal 210. In some examples, an image recognition network is set in the server 220, to classify the 3D medical image sent by the terminal 210.

Certainly, in some examples, an image recognition network may be deployed on a side of the terminal 210. The terminal 210 locally implements the 3D medical image recognition method (that is, the image recognition network) provided in the examples of this application without the server 220. Correspondingly, training of the image recognition network may be completed on the side of the terminal 210. This is not limited in this example of this application. For ease of description, an example in which the 3D medical image recognition method is performed by a computer is used in the following examples for description.

FIG. 3 is a flowchart of a 3D medical image recognition method according to an example of this application. The method includes the following steps.

Step 301: Perform, in an $i^{th}$-round feature extraction process, view rearrangement processing on an $(i-1)^{th}$-round 3D medical image feature to obtain 2D image features, the $(i-1)^{th}$-round 3D medical image feature is obtained by performing $(i-1)^{th}$-round feature extraction on a 3D medical image, and different 2D image features are features of the $(i-1)^{th}$-round 3D medical image feature in different views.

The 3D medical image feature is extracted from a to-be-recognized 3D medical image. The to-be-recognized 3D medical image may be a computed tomography (CT) image, a magnetic resonance imaging (MRI) image, a positron emission computed tomography (PET) image, or another 3D medical image.

A first-round 3D medical image feature is obtained by performing feature extraction on an initial 3D medical image feature. The initial 3D medical image feature is obtained by performing initial patch embedding on the 3D medical image. Initial patch embedding is used for mapping the 3D medical image, high-dimensional data, to a low-dimensional space, to obtain the low-dimensional initial 3D medical image feature.

In this example of this application, 3D medical image recognition is performed through a plurality of rounds of feature extraction processes. A same feature extraction network is used for feature extraction in each round of feature extraction process. An input of the feature extraction network in each round of feature extraction process is determined based on an output result of a previous round of feature extraction process, that is, feature extraction is performed in the $i^{th}$-round feature extraction process based on the $(i-1)^{th}$-round 3D medical image feature.

The 3D medical image feature is 3D data, so that when feature extraction is performed on the entire 3D medical image feature, a computation amount is large, and a process is complex. Therefore, in this example of this application, the 3D medical image feature is first split in each round of feature extraction process, that is, view rearrangement is performed on the feature obtained through $(i-1)^{th}$-round feature extraction in the $i^{th}$-round feature extraction process. View rearrangement splits the 3D medical image feature into the 2D image features in different views, so that feature extraction is performed on the 2D image features in different views, to reduce computation complexity.

In some examples, a processing process of view rearrangement is implemented by the following method: performing view rearrangement processing on a plurality of dimensions of the $(i-1)^{th}$-round 3D medical image feature to obtain 2D image features in a plurality of views, that is, performing permutation and combination processing on the plurality of dimensions of the $(i-1)^{th}$-round 3D medical image feature to obtain the plurality of views, and extracting a 2D image feature in each view.

In an implementation, view rearrangement is performed on (H, W, D) dimensions of the $(i-1)^{th}$-round 3D medical image feature to obtain 2D image features in three (H, W), (H, D), and (W, D) views. Each view corresponds to one 2D direction of the 3D medical image feature. Different 2D image features are image features corresponding to different 2D image slices. The 2D image slice is a 2D image in a 2D space after view rearrangement is performed on the 3D medical image.

It should be noted that when feature extraction is performed in the $i^{th}$-round feature extraction process based on the $(i-1)^{th}$-round 3D medical image feature, the $(i-1)^{th}$-round 3D medical image feature may be upsampled or downsampled. In this case, view rearrangement is performed on the upsampled or downsampled $(i-1)^{th}$-round 3D medical image feature to obtain the 2D image features.

Step 302: Perform semantic feature extraction processing on each 2D image feature to obtain image semantic features in different views.

For example, after each 2D image feature is obtained, semantic feature extraction is performed on the 2D image feature, to learn image information in a corresponding 2D image slice. A process of performing semantic feature extraction on the 2D image feature includes learning of spatial information of the 2D image slice and image semantic learning based on the corresponding view.

After semantic feature extraction is performed on each 2D image feature, the image semantic features respectively corresponding to different views may be obtained, that is, image semantic features respectively corresponding to the three (H, W), (H, D), and (W, D) views are obtained.

Step 303: Perform feature fusion processing on the image semantic features in different views to obtain an $i^{th}$-round 3D medical image feature.

In an implementation, after the image semantic features in different views are obtained, the image semantic features in different views may be fused, to complete this round of feature extraction process to obtain the $i^{th}$-round 3D medical image feature. Then, an $(i+1)^{th}$-round 3D medical image feature extraction process is performed based on the $i^{th}$-round 3D medical image feature.

In this example of this application, feature fusion is performed on the image semantic features in different views, to aggregate rich semantics in full-view learning. In this way, a feature learning process of the 3D medical image feature is completed.

Step 304: Perform image recognition processing on an $I^{th}$-round 3D medical image feature obtained through $I^{th}$-round feature extraction, to obtain an image recognition result of the 3D medical image, i is a positive integer that increases in sequence, $1 < i \le I$, and I is a positive integer.

Feature extraction is ended after the plurality of rounds of feature extraction process. After an $I^{th}$-round feature extraction process is ended, image recognition is performed based on the $I^{th}$-round 3D medical image feature.

In summary, in this example of this application, in each feature extraction phase, view rearrangement is first performed on a 3D medical image feature, to split the 3D medical image feature into 2D image features in different views, feature extraction is performed on the 2D image features respectively to obtain image semantic features in different views, and the image semantic features in different views are fused to obtain a 3D image semantic feature after feature extraction. In this process, feature extraction is performed on the 2D image features in different views, so that compared with the related art in which a 3D image feature is directly extracted, in this example of this application, feature extraction is performed in different views by using a reduced local computation unit. In this way, computation complexity may be reduced. Therefore, 3D medical image recognition efficiency is improved.

In some examples, in a process of performing feature extraction on the 2D image features in different views, each 2D image feature is split, to learn features corresponding to local windows and learn a context feature of the slice corresponding to each 2D image feature, to obtain image semantic features in different views. The following provides descriptions by using an example.

FIG. 4 is a flowchart of a 3D medical image recognition method according to an example of this application. The method includes the following steps.

Step 401: Perform, in an $i^{th}$-round feature extraction process, view rearrangement processing on an $(i-1)^{th}$-round 3D medical image feature to obtain 2D image features.

After a 3D medical image is obtained, initial patch embedding is first performed on the 3D medical image. For example, initial patch embedding may be performed by using a convolutional stem structure, to obtain an initial 3D medical image feature. Then, a plurality of rounds of feature extraction processes are performed by using the initial 3D medical image feature as a starting point. A convolutional stem is an initial convolutional layer of a convolutional neural network (CNN). Initial patch embedding is used for mapping the 3D medical image, high-dimensional data, to a low-dimensional space, to obtain the low-dimensional initial 3D medical image feature.

In this example of this application, the feature extraction process includes a feature encoding process and a feature decoding process. The feature encoding process includes a 3D medical image feature downsampling process, that is, reducing a dimension of the 3D medical image feature. The feature decoding process includes a 3D medical image feature upsampling process, that is, raising the dimension of the 3D medical image feature. In the downsampling process, 3D convolution with a kernel size of 3 and a stride of 2 is used, and the 3D medical image feature is downsampled twice each time. In the upsampling process, 3D transposed convolution with a kernel size of 2 and a stride of 2 is used, and the 3D medical image feature is upsampled twice each time. After feature encoding and feature decoding are performed for a plurality of rounds, the medical image is recognized by using an obtained 3D medical image feature. Each round of feature extraction process is implemented by using a same TR-MLP structure.

Figure 5:
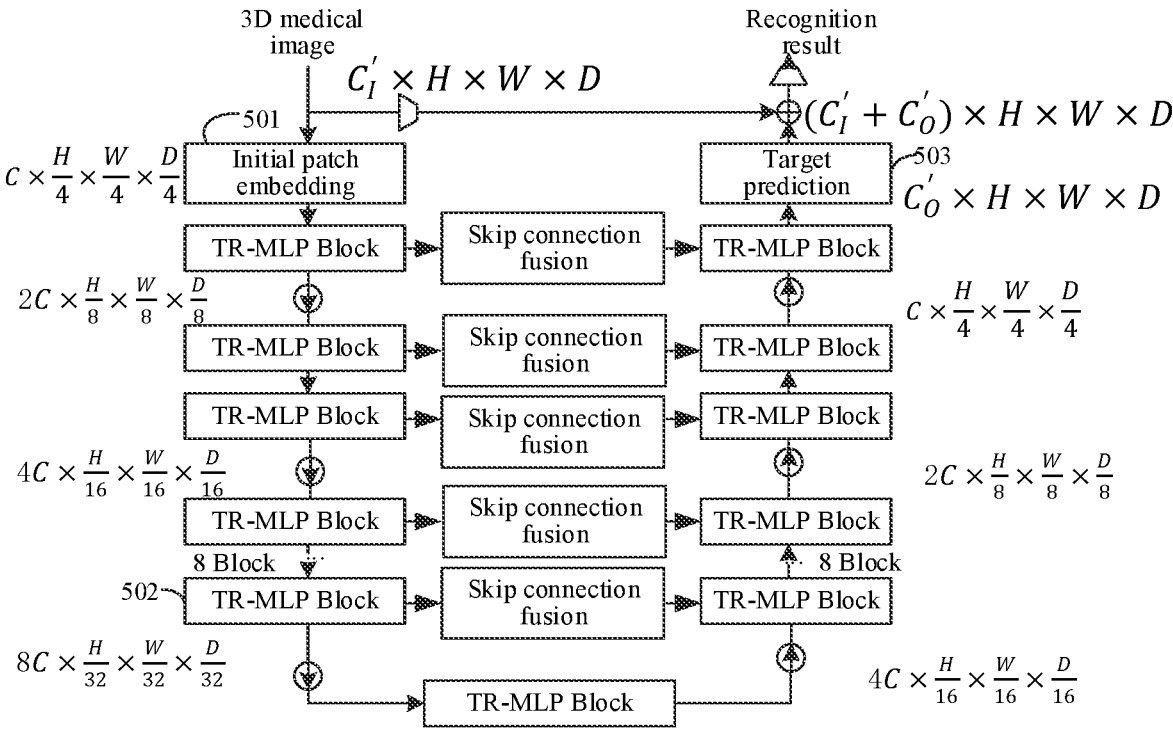
FIG. 5 is a schematic diagram of a structure of an entire image recognition structure according to an example of this application.

For example, as shown in FIG. 5, the 3D medical image whose size is $C_i \times H \times W \times D$ is input. Initial patch embedding 501 is first performed to obtain a $C \times H/4 \times W/4 \times D/4$ 3D medical image feature. A size of an image patch is 2×2. The $C \times H/4 \times W/4 \times D/4$ 3D medical image feature is input to a first TR-MLP block for first-round feature extraction. After first-round feature extraction is ended, an obtained first-round 3D medical image feature is downsampled to obtain a $2C \times H/8 \times W/8 \times D/8$ 3D medical image feature. The $2C \times H/8 \times W/8 \times D/8$ 3D medical image feature is input to a second TRMLP block, and second-round feature extraction is performed to obtain a second-round 3D medical image feature. Then, the second-round 3D medical image feature is input to a third TR-MLP block for third-round feature extraction. After the third round is ended, an obtained third-round 3D medical image feature is downsampled. When $8C \times H/32 \times W/32 \times D/32$ is reached through downsampling, an upsampling process is performed. A feature extraction process performed in a TR-MLP block 502 and a feature extraction process performed in a TR-MLP block before the TR-MLP block 502 are feature encoding processes, and a feature extraction process performed in a TR-MLP block after the TR-MLP block 502 is a feature decoding process.

It should be noted that each round of feature encoding process or feature decoding process is implemented by view rearrangement processing, semantic feature processing, and feature fusion processing.

It should be noted that Step 302 in FIG. 3 may be implemented by step 402 and step 403 in FIG. 4.

Step 402: Perform spatial feature extraction processing on the 2D image feature to obtain a 2D image spatial feature.

After the 2D image feature corresponding to each view is obtained, spatial feature extraction is first performed on the 2D image feature. A spatial feature extraction process is a process of learning a feature of each corresponding 2D image slice. When spatial feature extraction is performed based on three views, a network parameter is shared, that is, the same network parameter is used. This process may include step 402*a* to step 402*c* (not shown in the figure):

Step 402*a*: Perform window division processing on the 2D image feature to obtain local 2D image features respectively corresponding to N windows, the N windows not overlapping each other, and N is a positive integer greater than 1.

In this process, long-distance and local spatial semantic information in the 2D image slice is constructed mainly by using a window-multi-head self-attention (W-MSA) network structure. When the 2D image feature is processed by using the W-MSA network structure, window division processing is first performed on the 2D image feature Z to split the 2D image feature into local 2D image features $Z^i$ corresponding to N non-overlapping windows. A division process may be shown in Formula (1):

$$Z == \{Z^1, Z^2, \ldots, Z^N\}, N = HW/M^2 \tag{1}$$

M is a window size specified by the W-MSA. HW is a size of the 2D image feature, that is, a 2D image size obtained through segmentation in an (H, W) view.

Then, attention computation is performed based on the window, to obtain an output result, that is, the local 2D image spatial feature.

It should be noted that attention processing is implemented by using an attention mechanism. In cognitive science, the attention mechanism is used for selectively paying attention to some of all information and ignoring the other information. The attention mechanism may enable the neural network to pay attention to some inputs, that is, select specific inputs. In a case of a limited computation capability, the attention mechanism is a resource allocation solution used as main means for solving an information overload problem, and a computing resource is allocated to a more important task. A form of the attention mechanism is not limited in this example of this application. For example, the attention mechanism may be multi-head attention, key-value attention, or structured attention.

Step 402*b*: Perform feature extraction processing on the N local 2D image features to obtain 2D image window features.

After the local 2D image features $Z^i$ respectively corresponding to the N non-overlapping windows are obtained, feature extraction is performed on each local 2D image feature, to obtain the N 2D image window features. A feature extraction processing manner includes the following steps:

Step 1: Perform self-attention processing on the N local 2D image features to obtain self-attention features respectively corresponding to the N local 2D image features.

It should be noted that self-attention processing is first performed on each local 2D image feature. A self-attention processing process is multi-head self-attention processing. Each local 2D image feature corresponds to a plurality of self-attention heads.

For example, self-attention processing is performed based on a query item Q, a key item K, and a value item V corresponding to the local 2D image feature to obtain the self-attention features of the N local 2D image features.

A query item Q, a key item K, and a value item V corresponding to a $k^{th}$ self-attention head are $$W_k^Q, W_k^K, W_k^V,$$

where k is a positive integer greater than 1. In this case, a calculation manner for a $k^{th}$ self-attention feature of a local 2D image feature $Z^i$ corresponding to an $i^{th}$ window is shown in Formula (2):

$$H_k^i = \text{Attention}(Z^i W_k^Q, Z^i W_k^K, Z^i W_k^V), i = 1, \ldots, N \tag{2}$$

$$\text{Attention}(Q, K, V) = \text{SoftMax}(QK^T/\sqrt{d_k} + RPE)V$$

RPE is relative position encoding information, that is, window position encoding, and indicates window-aware spatial position information.

In this case, the self-attention feature corresponding to the $k^{th}$ self-attention head includes features corresponding to the N windows, as shown in Formula (3):

$$H_k = \{H_k^1, H_k^2, \ldots, H_k^N\} \tag{3}$$

Step 2: Perform feature fusion processing on the self-attention features of the N local 2D image features to obtain a first image window internal feature.

After the self-attention feature corresponding to each self-attention head corresponding to each window is obtained, the self-attention features corresponding to all the self-attention heads are concatenated, and linear mapping is performed by using a parameter matrix, to implement feature fusion processing to obtain the corresponding first image window internal feature. This manner is shown in Formula (4):

$$W - MSA(Z) = \text{Concat}[H_1, H_2, \ldots, H_k]W^H \tag{4}$$

$W^H$ is the parameter matrix. Concat indicates a concatenation operation.

In some examples, before self-attention processing is performed based on the W-MSA structure, normalization processing needs to be first performed on a $1^{th}$ local 2D image feature $$Z_l^v$$

in a v view. For example, normalization processing may be implemented by batch normalization (BN). The v view is one of (H, W), (H, D), and (W, D) views. After normalization processing, the normalized local 2D image feature $$Z_l^v$$

is input to the W-MSA structure for self-attention processing.

Figure 6:
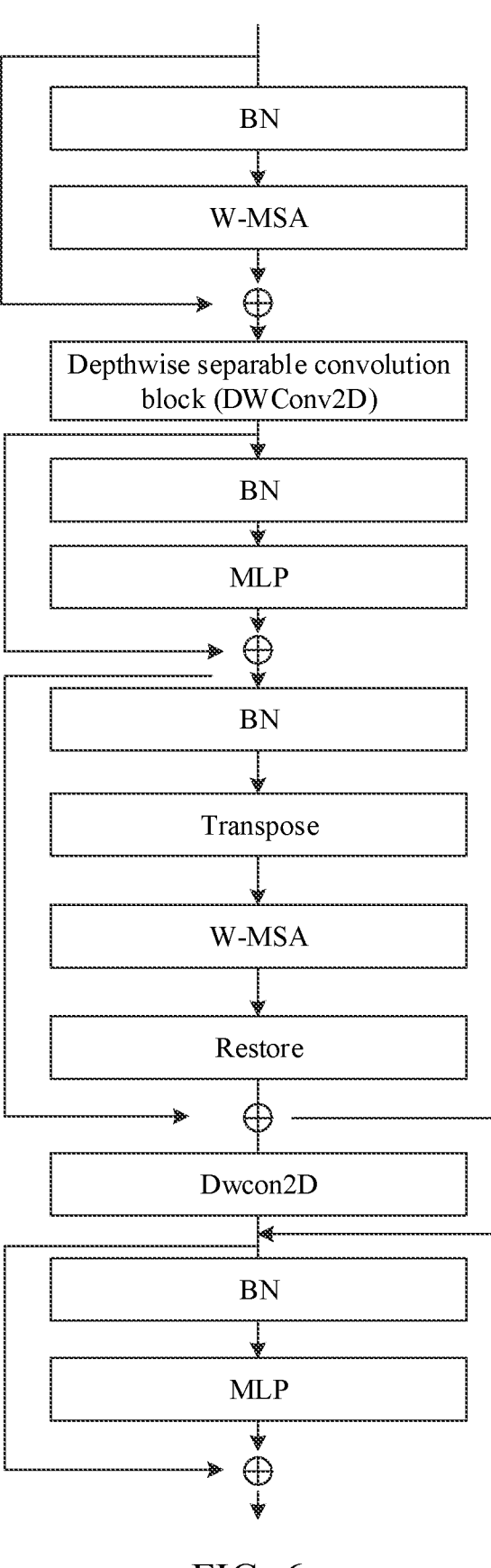
FIG. 6 is a schematic diagram of a structure of a spatial feature extraction process according to an example of this application.

For example, as shown in FIG. 6, after BN processing, $$Z_l^v$$

is input to the W-MSA for self-attention processing. The W-MSA includes a residual structure. That is, an output result of the W-MSA is fused with the original input feature $$Z_l^v,$$

to implement feature fusion processing to obtain a first image window internal feature $$X_l^v$$

(that is, a feature after product processing), as shown in Formula (5):

$$X_l^v = W - MSA(BN(Z_l^v)) + Z_l^v \qquad (5)$$

$$v = \{1, 2, 3\}$$

Step 3: Perform convolution processing on the first image window internal feature to obtain a first image window interactive feature.

The W-MSA structure is used for learning each local 2D image feature obtained through division. To further enhance learning of the 2D image feature, a depthwise separable convolution block (DWConv2D) structure with a kernel size of 5 is used for convolution processing, to enhance localized learning between spatially adjacent windows. For example, the first image window internal feature is input to a DWConv2D network, and convolution processing is performed to obtain the first image window interactive feature.

In some examples, the DWConv2D may also include a residual structure. That is, a first image window internal feature obtained after convolution processing is fused with the first image window internal feature, to obtain a first image window interactive feature $$Y_l^v,$$

as shown in Formula (6):

$$Y_l^v = DWConv2D(X_l^v) + X_l^v \qquad (6)$$

For example, as shown in FIG. 6, the first image window internal feature $$X_l^v$$

is input to the DWConv2D for convolution processing, and a feature obtained after convolution processing is fused with $$X_l^v$$

to obtain the first image window interactive feature $$Y_l^v.$$

Step 4: Perform feature extraction processing on the first image window interactive feature by using an MLP to obtain the 2D image window feature.

To further enhance learning of the 2D slice in the corresponding view, normalization processing is performed, through BN, on the first image window interactive feature obtained after convolution processing, and a channel feature, that is, a feature of the 2D image slice in the corresponding view, is learned by using the MLP, to obtain a 2D image window feature $$Z_l^{v\prime},$$

as shown in Formula (7):

$$Z_l^{v\prime} = MLP(BN(Y_l^v)) + Y_l^v \qquad (7)$$

MLP indicates an MLP structure.

Step 402c: Perform transposition processing on the N windows, and perform feature extraction processing on the 2D image window features respectively corresponding to the N windows after transposition, to obtain the 2D image spatial feature, transposition is used for changing spatial positions of the N windows.

W-MSA After window-based self-attention learning is performed by using the W-MSA structure, cross-window image feature information learning further needs to be performed. Therefore, in a possible implementation, transposition is performed on the N windows, to learn the 2D image window features after transposition again.

For example, transposition may be performed through a shuffle operation, to scramble the spatial information and enhance cross-window information interaction. After transposition, the 2D image window features respectively corresponding to the N windows are learned, to obtain the final 2D image spatial feature. This manner may include the following steps:

Step 1: Perform self-attention processing on the 2D image window features respectively corresponding to the N windows after transposition, to obtain self-attention features respectively corresponding to the N windows.

Self-attention processing is first performed on the 2D image window features respectively corresponding to the N windows after transposition, to obtain the self-attention features. For a manner, refer to the foregoing steps. Details are not described herein again.

Step 2: Perform feature fusion processing on the N self-attention features to obtain a second image window internal feature.

For a process of performing feature fusion to obtain the second image window internal feature, refer to a process of performing fusion to obtain the first image window internal feature. Details are not described herein again.

Step 3: Restore the second image window internal feature, and perform convolution processing on a restored second image window internal feature to obtain a second image window interactive feature.

For example, the windows are transposed again, and then window-based self-attention learning is performed once again by using the W-MSA structure, to enhance cross-window information learning. Then, the second image window internal feature is restored, that is, position information corresponding to each window is restored, to restore the window to an original position, to obtain the second image window interactive feature.

For example, as shown in FIG. 6, after BN processing is performed on the 2D image window features, a transposition operation (Transpose) is performed, and feature learning (including self-attention processing and feature fusion processing) is performed, based on the W-MSA structure, on the 2D image window features respectively corresponding to the N windows after transposition, to obtain the second image window interactive feature. The N windows are restored again to restore the position information corresponding to each window, as shown in Formula (8):

$$X_l^{y\prime} = R(W - MSA(T(BN(Z_l^y)))) + Z_l^y \tag{8}$$

$$X_l^{y\prime}$$

indicates a feature after the second image window interactive feature is restored, that is, a restored second image window internal feature. T indicates the transposition operation. R indicates a restoration operation.

$$Z_l^y$$

indicates the 2D image window feature.

After restoration is performed, convolution processing is performed again by using the DWConv2D, to obtain the second image window interactive feature. For this process, refer to a process of performing convolution processing to obtain the first image window interactive feature in the foregoing steps. Details are not described herein again.

For example, as shown in FIG. 6, $$X_l^{y\prime}$$

is input to the DWConv2D structure, and convolution processing is performed to obtain a second image window interactive feature $$Y_l^{y\prime},$$

as shown in Formula (9):

$$Y_l^{y\prime} = DWConv2D(X_l^{y\prime}) + X_l^{y\prime} \tag{9}$$

Step 4: Perform feature extraction processing on the second image window interactive feature by using the MLP to obtain the 2D image spatial feature.

For example, after the convolution processing process, channel learning is performed again by using the MLP, to obtain the final 2D image spatial feature.

For example, as shown in FIG. 6, normalization processing is first performed on the second image window interactive feature $$Y_l^{y\prime},$$

normalized $$Y_l^{y\prime}$$

is input to the MLP, and feature extraction is performed to obtain a final 2D image spatial feature $$\hat{Z}_l^{y\prime},$$

as shown in Formula (10):

$$\hat{Z}_l^y = MLP(BN(Y_l^{y\prime})) + Y_l^{y\prime} \tag{10}$$

Performing spatial feature extraction on the 2D image feature to obtain the 2D image spatial feature is a full-view slice spatial shuffle block process. FIG. 6 shows the entire process. In this way, the 2D image feature is fully learned, to accurately extract the 2D image spatial feature for subsequent accurate image recognition.

Step 403: Perform semantic feature extraction processing on the 2D image spatial feature based on a main view and an auxiliary view, to obtain an image semantic feature, the main view is a view corresponding to the 2D image feature, and the auxiliary view is a view different from the main view in a 3D view.

The 2D image spatial feature indicates only a feature corresponding to a 2D view (that is, the main view). Therefore, after spatial feature extraction is performed on each 2D image feature to obtain the 2D image spatial feature, remaining semantic information corresponding to a remaining third view (that is, the auxiliary view) is captured for supplementary information learning. A process of performing semantic feature extraction on the 2D image spatial feature to obtain the image semantic feature is a slice-aware volume context mixing process. A network parameter of an SAVCM network is shared in each view, that is, the same network parameter is used. This process may include the following steps:

Step 403*a*: Perform feature fusion processing on the 2D image spatial feature and a position encoding feature to obtain a first image semantic feature, the position encoding feature is used for indicating position information corresponding to the 2D image feature.

In a possible implementation, an absolute position encoding (APE) feature (that is, the position encoding feature) is first added to each 2D image spatial feature $$\hat{Z}_l^{\nu\prime},$$

to indicate spatial position information of the corresponding 2D image feature, that is, spatial position information of the corresponding 2D image slice, that is, to indicate position information corresponding to the 2D image feature. The position encoding feature is an automatic learning parameter. Therefore, the position information of the 2D image slice is injected into the 2D image spatial feature $$\hat{Z}_l^{\nu\prime},$$

to implement slice position aware learning.

Figure 7:
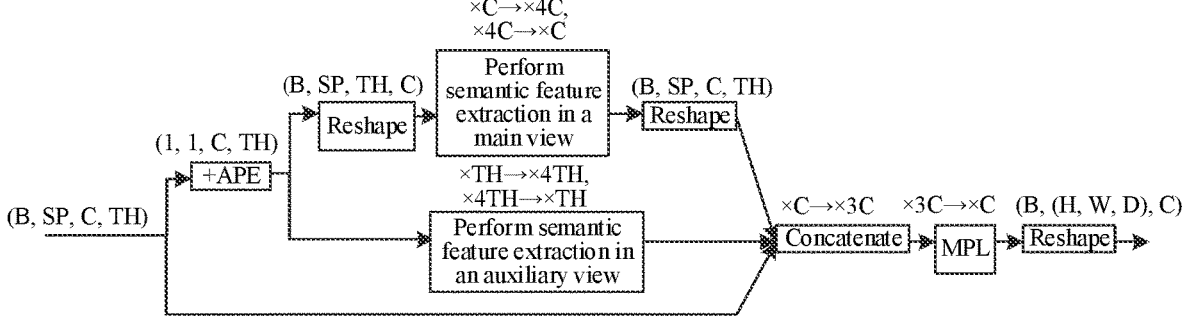
FIG. 7 is a schematic diagram of a structure of a semantic feature extraction process according to an example of this application.

For example, as shown in FIG. 7, feature fusion is performed on the 2D image spatial feature and the position encoding feature to obtain a first image semantic feature $$A_l^{\nu},$$

as shown in Formula (11):

$$A_l^{\nu} = \hat{Z}_l^{\nu} + APE_s \tag{11}$$

$APE_s$ indicates spatial position encoding corresponding to $$\hat{Z}_l^{\nu}.$$

Step 403*b*: Perform semantic feature extraction on the first image semantic feature in the main view by using an MLP, to obtain a main image semantic feature.

In a possible implementation, semantic feature extraction is performed in the main view and the auxiliary view respectively. The main view is the view corresponding to the 2D image feature. The auxiliary view is the view different from the main view in the 3D view. For example, $$\hat{Z}_l^{\nu}$$

is a 2D image spatial feature extracted from a 2D image feature in the (H, W) view. In this case, the main view is (H, W), and the auxiliary view is the remaining D view.

For example, semantic feature extraction is performed on the first image semantic feature in the main view by using a residual axial-MLP, to obtain a main image semantic feature $$MLP_{sc}(A_l^{\nu}).$$

As shown in FIG. 7, the first image semantic feature $$A_l^{\nu}$$

(B, SP, C, TH) is first reshaped to obtain (B, SP, TH, C). Then, extraction is performed by using the MLP in a channel (C) direction. A dimension is first raised to 4C, and then is restored to an original channel number C after extraction, and then the extracted main image semantic feature is restored to obtain (B, SP, C, TH). SP indicates a spatial dimension in the main view.

Step 403*c*: Perform semantic feature extraction on the first image semantic feature in the auxiliary view by using an MLP, to obtain an auxiliary image semantic feature.

When semantic feature extraction is performed based on the main view, semantic feature extraction is performed on the first image semantic feature in the auxiliary view by using the MLP, to obtain an auxiliary image semantic feature $$MLP_{st}(A_l^{\nu}).$$

As shown in FIG. 7, semantic feature extraction is performed on the first image semantic feature in the auxiliary view. That is, a dimension is first raised to 4TH, and then is restored to an original dimension TH after the first image semantic feature is extracted. TH indicates a spatial dimension in the auxiliary view.

Step 403*d*: Perform feature fusion processing on the main image semantic feature and the auxiliary image semantic feature to obtain the image semantic feature.

For example, after the main image semantic feature and the auxiliary image semantic feature are obtained, feature fusion is performed on the main image semantic feature and the auxiliary image semantic feature, to obtain the image semantic feature. In a possible implementation, as shown in FIG. 7, the main image semantic feature $$MLP_{sc}(A_l^{\nu}),$$

the auxiliary image semantic feature $$MLP_{st}(A_l^{\nu}),$$

and the original feature $$\hat{Z}_l^{\nu}$$

are concatenated to obtain a concatenated feature. Then, the concatenated feature is mapped by using the MLP to restore the original channel number to obtain an image semantic feature $\hat{\mathbf{A}}_l^v$. In this process, image feature information in the third view is fused, so that context information of the 2D image slice may be perceived, and feature learning accuracy may be improved. This process is shown in Formula (12):

$$\text{Axial-}MLP(\hat{Z}_l^v) = [MLP_{st}(A_l^v);\ MLP_{sc}(A_l^v)] \tag{12}$$

$$\hat{A}_{l+1}^v = MLP_{cp}(Concat[\text{Axial-}MLP(\hat{Z}_l^v);\ \hat{Z}_l^v])$$

Axial-MLP indicates an axial-MLP operation. Concat indicates a concatenation operation. $MLP_{cp}$ indicates a feature fusion operation.

It should be noted that Step 303 in FIG. 3 may be implemented by step 404 and step 405 in FIG. 4.

Step 404: Perform fusion processing on the image semantic feature and a view feature to obtain a view image semantic feature.

In a feature fusion process, an APE is first added to the image semantic feature $$\hat{A}_{l+1}^v$$

corresponding to each view, to implement fusion processing of the image semantic feature and the view feature to obtain a view image semantic feature $$V_{l+1}^v.$$

A process of aggregating the rich semantics in full-view learning is performed on a channel, so that the APE is added to a full-view feature channel to make a view in aggregation perceivable, as shown in Formula (13). APE is encoding corresponding to the channel, and is used for indicating the corresponding view, that is, the view feature, for example, the (H, W) view.

$$V_{l+1}^v = \hat{A}_{l+1}^v + APE_{vi} \tag{13}$$

Step 405: Perform feature fusion processing on each view image semantic feature to obtain an $i^{th}$-round 3D medical image feature.

Then, full-view features $$V_{l+1}^v$$

(that is, view image semantic features) of three channels are concatenated to obtain a concatenated feature, where the channel number×3. Then, normalization (LN) is performed on the concatenated feature by using a natural logarithm. Finally, a normalized feature is mapped back to the original channel number by using an MLP view aggregator $MLP_{va}$, to obtain a medical body feature output $Z_{l+1}$ of a current TR-MLP block, that is, the $i^{th}$-round 3D medical image feature, that is:

$$Z_{l+1} = MLP_{va}(LN(Concat[V_{l+1}^1;\ V_{l+1}^2;\ V_{l+1}^3]))$$

Concat indicates a concatenation operation. LN indicates a normalization operation. $MLP_{va}$ indicates a mapping operation.

Figure 8:
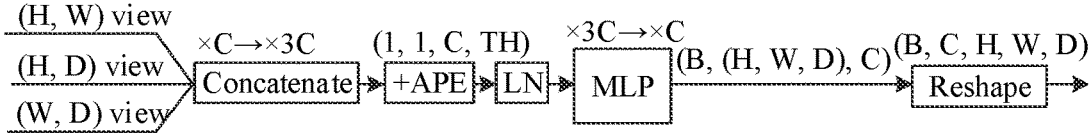
FIG. 8 is a schematic diagram of a structure of a feature fusion process according to an example of this application.

As shown in FIG. 8, each image semantic feature is first fused with APE, and then concatenation is performed on the three views to obtain a final 3D medical image feature.

It should be noted that Step 304 in FIG. 3 may be implemented by step 406 and step 407 in FIG. 4. The feature extraction process includes the feature encoding process or the feature decoding process. The feature encoding process includes the 3D medical image feature downsampling process, that is, reducing a dimension of the 3D medical image feature. The feature decoding process includes the 3D medical image feature upsampling process, that is, raising the dimension of the 3D medical image feature.

Step 406: Determine, in a case that an upsampling result reaches an original size, the 3D medical image feature obtained through extraction as an $I^{th}$-round 3D medical image feature obtained through $I^{th}$-round feature extraction.

In a possible implementation, when the upsampling result reaches the original size of the 3D medical image, it is determined this is an $I^{th}$-round feature extraction process. For example, as shown in FIG. 5, when $$C_o' \times H \times W \times D$$

is reached, a corresponding result is determined as the $I^{th}$-round 3D medical image feature, and target prediction 503 (that is, image recognition) is performed by using the $I^{th}$-round 3D medical image feature to obtain an image recognition result. To further enhance image recognition accuracy, a target prediction result is fused with the feature corresponding to the initially input 3D medical image, to perform image recognition based on a fused feature. As shown in FIG. 5, convolution is first performed on the input 3D medical image $C_i \times H \times W \times D$ to obtain an initial 3D medical image feature $C_i' \times H \times W \times D$ of the initial image, $C_o' \times H \times W \times D$ is fused with $C_i' \times H \times W \times D$, and convolution is performed to obtain a final output result.

Step 407: Perform image recognition processing based on the $I^{th}$-round 3D medical image feature to obtain the image recognition result.

Finally, image recognition is performed based on the $I^{th}$-round 3D medical image feature, so that image registration, classification, and the like may be subsequently performed on the 3D medical image.

Figure 9:
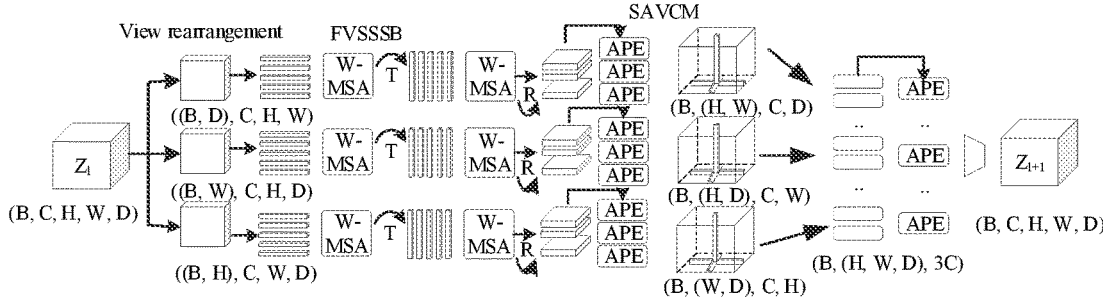
FIG. 9 is a schematic diagram of a structure of a transformer-multilayer perceptron (TR-MLP) network according to an example of this application.

In a possible implementation, FIG. 9 shows a TR-MLP network structure. View rearrangement is first performed on (H, W, D) dimensions of the 3D medical image feature Z 1 input in a current block, to obtain 2D image slices in three (H, W), (H, D), and (W, D) views. Each view corresponds to one 2D slice direction of the 3D medical image feature. 2D slice information of the full-view 2D image slices after rearrangement is fully learned by using the FVSSSB, to obtain the two-dimensional image features. Then, remaining image semantic information in the third view is captured by using SAVCM. Finally, rich semantics in full-view learning is aggregated by using a view-aware aggregator to finally obtain a 3D medical image feature $Z_{l+1}$ of the TR-MLP block as an input feature of a next TR-MLP block. Computation is performed in parallel for the three views. In addition, the parameters of the FVSSSB network and the SAVCM network are shared in each view, that is, a feature extraction network corresponding to the same network parameter is used for performing semantic feature extraction on the two-dimensional image feature in each view, to obtain the image semantic features in different views.

In this example of this application, full-view 2D spatial information is first learned, then remaining image semantics in the third view, the full-view semantics is fused to implement a context-aware capability for the 3D medical image feature and greatly enhance an inductive bias capability, so that 3D medical image recognition accuracy is improved. In addition, a 3D CNN and a vision transformer that involves a large amount of computation are replaced with a reduced local vision TR-MLP computation unit, so that the computation complexity is reduced, and the recognition efficiency is improved.

The feature extraction process includes the feature encoding process or the feature decoding process. The extraction process includes a self-attention processing process. Self-attention computation is performed in the self-attention processing process based on Q, K, and V. In a possible implementation, to fuse multi-scale visual features, a feature of the feature encoding process (implemented by an encoder) and a feature of the feature decoding process (implemented by a decoder) are fused to obtain Q, K, and V values in the feature decoding process.

In some examples, a K value in a $t^{th}$-round feature decoding process is obtained through fusion based on a K value in $(t-1)^{th}$-round feature decoding and a K value in a corresponding feature encoding process. A V value in the $t^{th}$-round feature decoding process is obtained through fusion based on a V value in $(t-1)^{th}$-round feature decoding and a V value in the corresponding feature encoding process. A Q value in the $t^{th}$-round feature decoding process is a Q value in $(t-1)^{th}$-round feature decoding.

In a possible implementation, a resolution of an input feature of $t^{th}$-round feature decoding is the same as that of an output feature of the corresponding encoding process, that is, skip connection fusion is performed on image features with a same resolution. For example, as shown in FIG. 5, a resolution corresponding to a second-round feature decoding process is 4C×H/16×W/16×D/16, and a corresponding feature encoding process in skip connection fusion is a last-round encoding process corresponding to a solution that is also 4C×H/16×W/16×D/16. When skip connection fusion is performed, skip connection fusion is performed on an input feature of second-round feature decoding (that is, a feature obtained after an output feature of first-round feature decoding is upsampled) and an output feature of the last-round feature encoding process.

An example in which the output feature of the feature encoding process corresponding to $t^{th}$-round feature decoding is $E^v$ and the input feature of the $t^{th}$-round feature decoding process is $D^v$ is used for description, where v indicates a specific view. In other words, skip connection fusion is performed in different views respectively. Convolution is first performed on $E^v$ and $D^v$ by using standard convolution (PWConv2D) with a kernel size of 1. A Q value in a feature decoding process is from only a last-round feature decoding process. For skip connection fusion of the encoder and the decoder, fusion is performed only on K values and V values. Therefore, as shown in FIG. 10, an original channel number of the encoder feature $E^v$ is split into two parts by using PWConv2D, to obtain a K value $K^{E^v}$ and a V value $V^{E^v}$ of the encoder $E^v$, as shown in Formula (14):

$$\text{Split}(\text{PWConv2D}(E^v))=\langle K^{E^v}, V^{E^v}\rangle \qquad (14)$$

Figure 10:
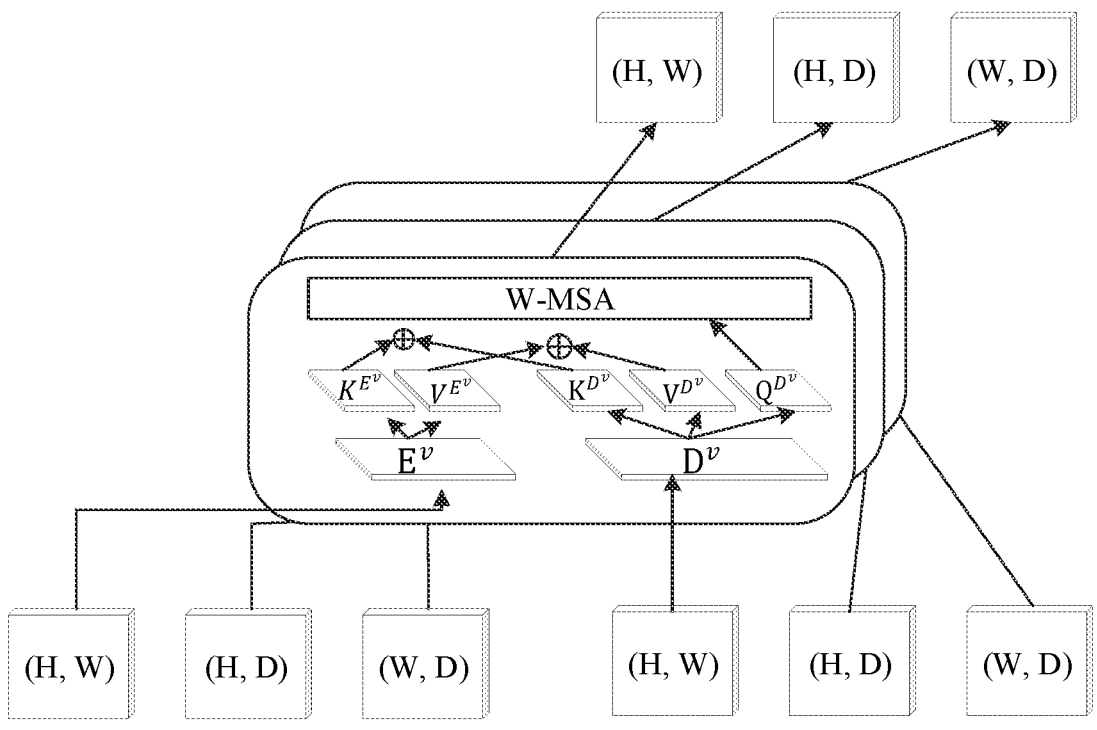
FIG. 10 is a schematic diagram of a structure of a skip connection fusion network according to an example of this application.

As shown in FIG. 10, an original channel number of the decoder feature $D^v$ is split into two parts by using PWConv2D, to obtain a Q value $Q^{D^v}$, a K value $K^{D^v}$, and a V value $V^{D^v}$ of the decoder, as shown in Formula (15):

$$\text{Split}(\text{PWConv2D}(D^v))=\langle Q^{D^v}, K^{D^v}, V^{D^v}\rangle \qquad (15)$$

Then, $K^{E^v}$ from the encoder is fused with $K^{D^v}$ from the decoder, and $V^{E^v}$ from the encoder is fused with $V^{D^v}$ from the decoder, as shown in Formula (16):

$$K_t^{D^{v'}} = K^{E^v} + K^{D^v}; V_t^{D^{v'}} = V^{E^v} + V^{D^v} \qquad (16)$$

$$K_t^{D^{v'}}$$

is a K value corresponding to the $t^{th}$-round feature decoding process.

$$V_t^{D^{v'}}$$

is a V value corresponding to the $t^{th}$-round feature decoding process. A Q value $$Q_t^{D^{v'}}$$

corresponding to the $t^{th}$-round feature decoding process is $Q^{D^v}$. The three values are used for learning of the W-MSA in the $t^{th}$-round feature decoding process, as shown in Formula (17):

$$\text{CrossMerge}(E^v, D^v) = W\text{-MSA}\left(Q_t^{D^{v'}}, K_t^{D^{v'}}, V_t^{D^{v'}}\right) \qquad (17)$$

CrossMerge indicates a skip connection fusion operation.

In this example of this application, a skip connection fusion network is introduced to perform skip connection fusion on corresponding features of the encoder and the decoder, to fuse multi-scale information and enrich image feature semantic learning.

Figure 11:
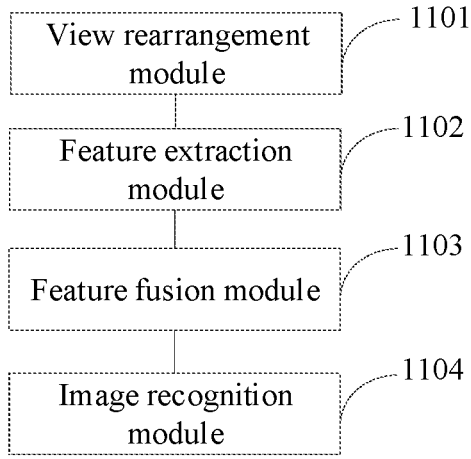
FIG. 11 is a block diagram of a structure of a 3D medical image recognition apparatus according to an example of this application.

FIG. 11 is a block diagram of a structure of a 3D medical image recognition apparatus according to an example of this application. As shown in FIG. 11, the apparatus includes:

a view rearrangement module 1101, configured to perform, in an $i^{th}$-round feature extraction process, view rearrangement processing on an $(i-1)^{th}$-round 3D medical image feature to obtain 2D image features, the $(i-1)^{th}$-round 3D medical image feature is obtained by performing $(i-1)^{th}$-round feature extraction on a 3D medical image, and different 2D image features are features of the $(i-1)^{th}$-round 3D medical image feature in different views; a feature extraction module 1102, configured to perform semantic feature extraction processing on each 2D image feature to obtain image semantic features in different views; a feature fusion module 1103, configured to perform feature fusion processing on the image semantic features in different views to obtain an $i^{th}$-round 3D medical image feature; and an image recognition module 1104, configured to perform image recognition processing on an $I^{th}$-round 3D medical image feature obtained through $I^{th}$-round feature extraction, to obtain an image recognition result of the 3D medical image, i is a positive integer that increases in sequence, $1<i\leq I$, and I is a positive integer.

In some examples, the feature extraction module 1102 includes:

a first extraction unit, configured to perform spatial feature extraction processing on the 2D image feature to obtain a 2D image spatial feature; and a second extraction unit, configured to perform semantic feature extraction processing on the 2D image spatial feature based on a main view and an auxiliary view, to obtain the image semantic feature, the main view is a view corresponding to the 2D image feature, and the auxiliary view is a view different from the main view in a 3D view.

In some examples, the first extraction unit is further configured to: perform window division processing on the 2D image feature to obtain local 2D image features respectively corresponding to N windows, the N windows not overlapping each other, and N is a positive integer greater than 1; perform feature extraction processing on the N local 2D image features to obtain 2D image window features; and perform transposition processing on the N windows, and perform feature extraction processing on the 2D image window features respectively corresponding to the N windows after transposition, to obtain the 2D image spatial feature, transposition is used for changing spatial positions of the N windows.

In some examples, the first extraction unit is further configured to:

perform self-attention processing on the N local 2D image features to obtain self-attention features respectively corresponding to the N local 2D image features; perform feature fusion processing on the N self-attention features to obtain a first image window internal feature; perform convolution processing on the first image window internal feature to obtain a first image window interactive feature; and perform feature extraction processing on the first image window interactive feature by using an MLP to obtain the 2D image window feature.

In some examples, the first extraction unit is further configured to:

perform self-attention processing on the 2D image window features respectively corresponding to the N windows after transposition, to obtain self-attention features respectively corresponding to the N windows; perform feature fusion processing on the N self-attention features to obtain a second image window internal feature; restore the second image window internal feature, and perform convolution processing on a restored second image window internal feature to obtain a second image window interactive feature; and perform feature extraction processing on the second image window interactive feature by using an MLP, to obtain the 2D image spatial feature.

In some examples, the first extraction unit is further configured to:

perform self-attention processing based on a query item Q, a key item K, and a value item V corresponding to the local 2D image feature to obtain the self-attention features of the N local 2D image features.

In some examples, the feature extraction process includes a feature encoding process or a feature decoding process. A K value in a $t^{th}$-round feature decoding process is obtained through fusion based on a K value in $(t-1)^{th}$-round feature decoding and a K value in a corresponding feature encoding process. A V value in the $t^{th}$-round feature decoding process is obtained through fusion based on a V value in $(t-1)^{th}$-round feature decoding and a V value in the corresponding feature encoding process. A Q value in the $t^{th}$-round feature decoding process is a Q value in $(t-1)^{th}$-round feature decoding.

In some examples, the second extraction unit is further configured to:

perform feature fusion processing on the 2D image spatial feature and a position encoding feature to obtain a first image semantic feature, the position encoding feature is used for indicating position information corresponding to the 2D image feature; perform semantic feature extraction processing on the first image semantic feature in the main view by using an MLP, to obtain a main image semantic feature; perform semantic feature extraction processing on the first image semantic feature in the auxiliary view by using the MLP, to obtain an auxiliary image semantic feature; and perform feature fusion processing on the main image semantic feature and the auxiliary image semantic feature to obtain the image semantic feature.

In some examples, the feature fusion module 1103 further includes:

a first fusion unit, configured to perform fusion processing on the image semantic feature and a view feature to obtain a view image semantic feature; and a second fusion unit, configured to perform feature fusion processing on each view image semantic feature to obtain the $t^{th}$-round 3D medical image feature.

In some examples, the feature extraction module 1102 is further configured to:

perform semantic feature extraction processing on the 2D image feature in each view by using a feature extraction network corresponding to a same network parameter, to obtain the image semantic features in different views.

In some examples, the feature extraction process includes the feature encoding process or the feature decoding process. The feature encoding process includes a 3D medical image feature downsampling process. The feature decoding process includes a 3D medical image feature upsampling process.

The image recognition module 1104 further includes:

a determining unit, configured to determine, in a case that an upsampling result reaches an original size, the 3D medical image feature obtained through extraction as the $I^{th}$-round 3D medical image feature obtained through $I^{th}$-round feature extraction; and a recognition unit, configured to perform image recognition processing based on the $I^{th}$-round 3D medical image feature to obtain an image recognition result.

In some examples, the 3D medical image is a CT image, an MRI image, or a PET image.

In summary, in this example of this application, in each feature extraction phase, view rearrangement is first performed on a 3D medical image feature, to split the 3D medical image feature into 2D image features in different views, feature extraction is performed on the 2D image features respectively to obtain image semantic features in different views, and the image semantic features in different views are fused to obtain a 3D medical image feature after feature extraction. In this process, feature extraction is performed on the 2D image features in different views, so that compared with the related art in which a 3D image feature is directly extracted for image recognition, in the examples of this application, feature extraction is performed in different views by using a reduced local computation unit.

In this way, computation complexity may be reduced. Therefore, 3D medical image recognition efficiency is improved.

It should be noted that division of the apparatus provided in the foregoing example into the functional modules is used merely as an example for description. In actual applications, depending on a requirement, the functions may be allocated to different functional modules for implementation, that is, an internal structure of the apparatus is divided into different functional modules to implement all or some of the functions described above. In addition, the apparatus provided in the foregoing example falls within a same concept as the method example. For details of a specific implementation process of the apparatus, refer to the method example. Details are not described herein again.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function is performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

Figure 12:
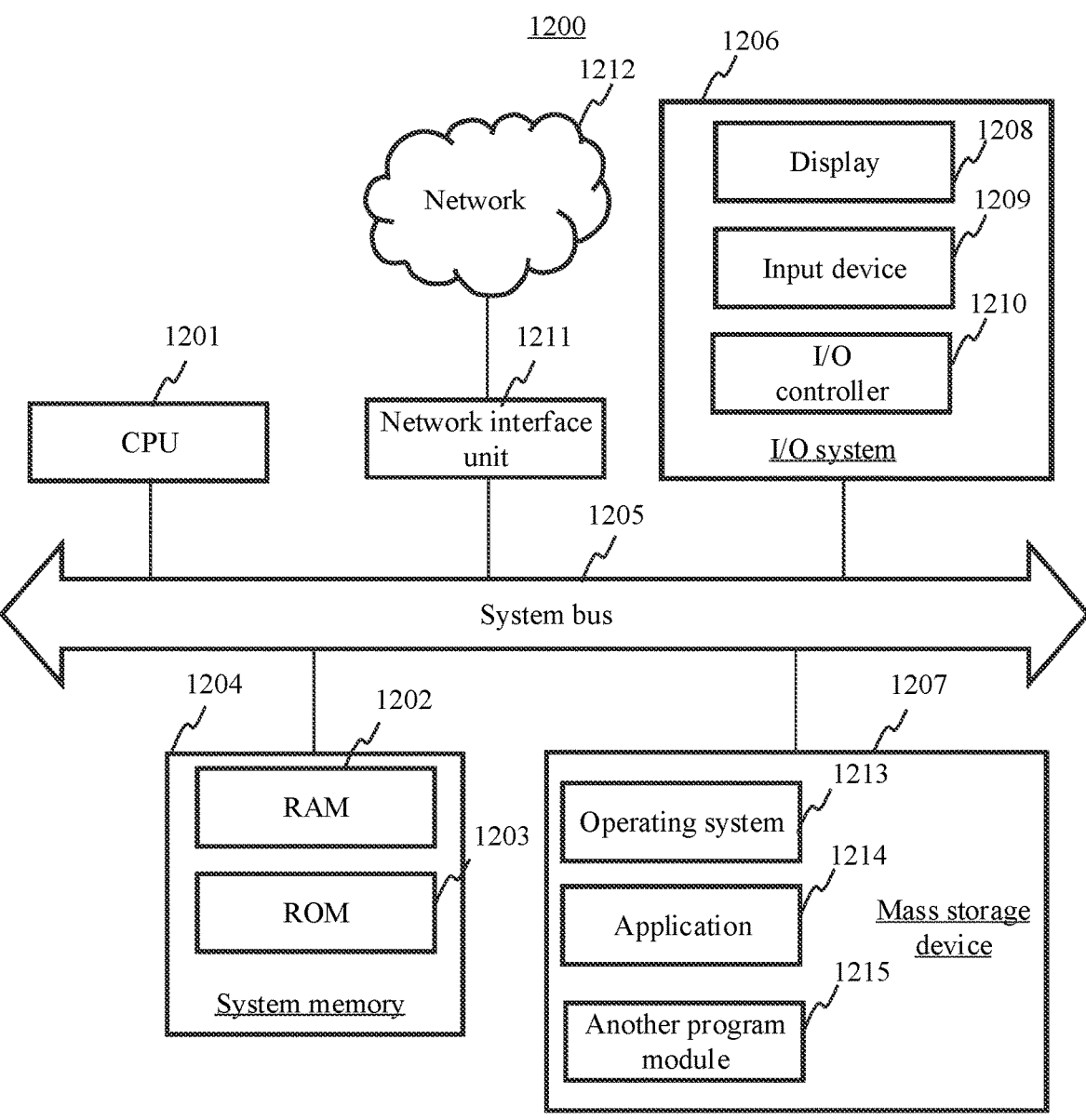
FIG. 12 is a schematic diagram of a structure of a computer according to an example of this application.

Referring to FIG. 12, which is a schematic diagram of a structure of a computer according to an example of this application. Specifically, the computer 1200 includes a central processing unit (CPU) 1201, a system memory 1204 including a random access memory (RAM) 1202 and a read-only memory (ROM) 1203, and a system bus 1205 connecting the system memory 1204 and the CPU 1201. The computer 1200 further includes a basic input/output (I/O) system 1206 that helps transmit information between devices in the computer, and a mass storage device 1207 configured to store an operating system 1213, an application 1214, and another program module 1215.

The basic I/O system 1206 includes a display 1208 configured to display information and an input device 1209 configured for a user to input information, for example, a mouse or a keyboard. Both the display 1208 and the input device 1209 are connected to the CPU 1201 by using an I/O controller 1210 connected to the system bus 1205. The basic I/O system 1206 may further include the I/O controller 1210 configured to receive and process inputs of a plurality of other devices, for example, the keyboard, the mouse, or an electronic stylus. Similarly, the I/O controller 1210 further provides an output to a display screen, a printer, or another type of output device.

The mass storage device 1207 is connected to the CPU 1201 by using a mass storage controller (not shown) connected to the system bus 1205. The mass storage device 1207 and a non-transitory computer-readable medium associated with the mass storage device 1207 provide non-volatile storage for the computer 1200. In other words, the mass storage device 1207 may include the non-transitory computer-readable medium (not shown), such as a hard disk or a driver.

Without loss of generality, the non-transitory computer-readable medium may include a computer storage medium and a communication medium. The computer storage medium includes volatile/nonvolatile and removable/irremovable media implemented by any method or technology for storing information, for example, computer-readable instructions, a data structure, a program module, or other data. The computer storage medium includes a RAM, a ROM, a flash memory or another solid state memory technology, a compact disc read-only memory (CD-ROM), a digital versatile disc (DVD) or another optical storage, a cassette, a magnetic tape, a disk storage, or another magnetic storage device. Certainly, a person skilled in the art may know that the computer storage medium is not limited to the foregoing. The system memory 1204 and the mass storage device 1207 may be collectively referred to as memories.

The memory stores one or more programs. The one or more programs are configured to be executed by one or more CPUs 1201. The one or more programs include instructions for implementing the foregoing method. The CPU 1201 executes the one or more programs to implement the method provided in each method example.

According to various examples of this application, the computer 1200 may further be connected, through a network such as the Internet, to a remote computer on the network for running. In other words, the computer 1200 may be connected to a network 1212 through a network interface unit 1211 connected to the system bus 1205, or may be connected to another type of network or a remote computer system (not shown) through a network interface unit 1211.

The memory further includes one or more programs. The one or more programs are stored in the memory. The one or more programs include instructions for performing the steps performed by the computer in the method provided in the examples of this application.

An example of this application further provides a non-transitory computer-readable storage medium. The non-transitory computer-readable storage medium stores at least one instruction, at least one piece of program, a code set, or an instruction set. The at least one instruction, the at least one piece of program, the code set, or the instruction set is loaded and executed by a processor to implement the 3D medical image recognition method as described in any one of the foregoing examples.

An example of this application provides a computer program product or computer program. The computer program product or computer program includes computer instructions. The computer instructions are stored in a non-transitory computer-readable storage medium. A processor of a computer reads the computer instructions from the non-transitory computer-readable storage medium. The processor executes the computer instructions to enable the computer to perform the 3D medical image recognition method provided in the foregoing aspect.

A person of ordinary skill in the art may understand that all or some of the steps in the foregoing examples may be completed by hardware by a program instructing related hardware. The program may be stored in a non-transitory computer-readable storage medium. The non-transitory computer-readable storage medium may be the non-transitory computer-readable storage medium included in the memory in the foregoing examples. Alternatively, the non-transitory computer-readable storage medium may be an independent non-transitory computer-readable storage medium that is not installed in the computer. The non-transitory computer-readable storage medium stores at least one instruction, at least one piece of program, a code set, or an instruction set. The at least one instruction, the at least one piece of program, the code set, or the instruction set is loaded and executed by the processor to implement the 3D medical image recognition method as described in any one of the foregoing method examples.

In some examples, the non-transitory computer-readable storage medium may include a ROM, a RAM, a solid state drive (SSD), an optical disk, or the like. The RAM may include a resistance random access memory (ReRAM) and a dynamic random access memory (DRAM). The sequence numbers of the examples of this application are merely for description and do not represent superiority-inferiority of the examples.

A person of ordinary skill in the art may understand that all or some of the steps in the foregoing examples may be completed by hardware or by a program instructing related hardware. The program may be stored in a non-transitory computer-readable storage medium. The storage medium may be a ROM, a magnetic disk, an optical disk, or the like.

The foregoing descriptions are merely some examples of this application, but are not intended to limit this application. Any modification, equivalent replacement, improvement, or the like made within the spirit and principle of this application shall fall within the protection scope of this application.

The invention claimed is:

1. A three-dimensional (3D) medical image recognition method, comprising:

in a multi-round feature extraction iteration process:

performing, in an $i^{th}$-round feature extraction process, view rearrangement processing on an $(i-1)^{th}$-round modified 3D medical image feature to obtain two-dimensional (2D) image features, wherein 2D image features being features of the $(i-1)^{th}$ round modified 3D medical image feature in different views, performing semantic feature extraction processing on each 2D image feature to obtain image semantic features in the different views, and performing feature fusion processing on the image semantic features in the different views to obtain an $i^{th}$-round modified 3D medical image feature; and performing image recognition processing on an $I^{th}$-round modified 3D medical image feature obtained through $I^{th}$-round feature extraction to obtain an image recognition result of a 3D medical image, wherein i is a positive integer that increases in sequence, $1<i\leq I$, I is a positive integer, and the modified 3D medical image feature in an initial round of the multi-round feature extraction iteration process is obtained by performing feature extraction on an initial 3D medical image feature, the initial 3D medical image feature being obtained by performing initial patch embedding on the 3D medical image.

2. The method according to claim 1, wherein the performing semantic feature extraction processing on each 2D image feature to obtain image semantic features in the different views comprises:

performing spatial feature extraction processing on the 2D image feature to obtain a 2D image spatial feature; and performing semantic feature extraction processing on the 2D image spatial feature based on a main view and an auxiliary view to obtain an image semantic feature, wherein the main view is a view corresponding to the 2D image feature, and the auxiliary view is a view different from the main view in a 3D view.

3. The method according to claim 2, wherein performing the spatial feature extraction processing on the 2D image feature to obtain a 2D image spatial feature comprises:

performing window division processing on the 2D image feature to obtain N local 2D image features respectively corresponding to N windows, wherein the N windows not overlapping each other, and N is a positive integer greater than 1;

performing feature extraction processing on the N local 2D image features to obtain 2D image window features;

performing transposition processing on the N windows; and performing feature extraction processing on the 2D image window features respectively corresponding to the N windows after transposition to obtain the 2D image spatial feature, wherein transposition is used for changing spatial positions of the N windows.

4. The method according to claim 3, wherein performing the feature extraction processing on the 2D image window features respectively corresponding to the N windows after transposition to obtain the 2D image spatial feature comprises:

performing self-attention processing on the 2D image window features respectively corresponding to the N windows after transposition to obtain N self-attention features respectively corresponding to the N windows;

performing feature fusion processing on the N self-attention features to obtain a second image window internal feature;

restoring the second image window internal feature;

performing convolution processing on a restored second image window internal feature to obtain a second image window interactive feature; and performing feature extraction processing on the second image window interactive feature by using a multilayer perceptron (MLP) to obtain the 2D image spatial feature.

5. The method according to claim 3, wherein performing the feature extraction processing on the N local 2D image features to obtain 2D image window features comprises:

performing self-attention processing on the N local 2D image features to obtain N self-attention features respectively corresponding to the N local 2D image features;

performing feature fusion processing on the N self-attention features to obtain a first image window internal feature;

performing convolution processing on the first image window internal feature to obtain a first image window interactive feature; and performing feature extraction processing on the first image window interactive feature by using an MLP to obtain the 2D image window feature.

6. The method according to claim 5, wherein performing the self-attention processing on the N local 2D image features to obtain self-attention features respectively corresponding to the N local 2D image features comprises:

performing self-attention processing based on a query item Q, a key item K, and a value item V corresponding to the N local 2D image feature to obtain the self-attention features of the N local 2D image features.

7. The method according to claim 6, wherein the $i^{th}$-round feature extraction process comprises a feature encoding process or a feature decoding process;

a K value in a $t^{th}$-round feature decoding process is obtained through fusion based on a K value in $(t-1)^{th}$-round feature decoding and a K value in a corresponding feature encoding process;

a V value in the $t^{th}$-round feature decoding process is obtained through fusion based on a V value in $(t-1)^{th}$-round feature decoding and a V value in the corresponding feature encoding process; and a Q value in the $t^{th}$-round feature decoding process is a Q value in $(t-1)^{th}$-round feature decoding; and t is a positive integer greater than 1.

8. The method according to claim 2, wherein performing the semantic feature extraction processing on the 2D image spatial feature based on a main view and an auxiliary view to obtain the image semantic feature comprises:

performing feature fusion processing on the 2D image spatial feature and a position encoding feature to obtain a first image semantic feature, wherein the position encoding feature is used for indicating position information corresponding to the 2D image feature;

performing semantic feature extraction processing on the first image semantic feature in the main view by using an MLP to obtain a main image semantic feature;

performing semantic feature extraction processing on the first image semantic feature in the auxiliary view by using the MLP to obtain an auxiliary image semantic feature; and performing feature fusion processing on the main image semantic feature and the auxiliary image semantic feature to obtain the image semantic feature.

9. The method according to claim 1, wherein performing the feature fusion processing on the image semantic features in the different views to obtain an $i^{th}$-round modified 3D medical image feature comprises:

performing fusion processing on the image semantic feature and a view feature to obtain a view image semantic feature; and performing feature fusion processing on each view image semantic feature to obtain the $i^{th}$ round modified 3D medical image feature.

10. The method according to claim 1, wherein performing the semantic feature extraction processing on each 2D image feature to obtain image semantic features in the different views comprises:

performing semantic feature extraction processing on the 2D image feature in each view by using a feature extraction network corresponding to a same network parameter to obtain the image semantic features in the different views.

11. The method according to claim 1, wherein the $i^{th}$-round feature extraction process comprises a feature encoding process or a feature decoding process, the feature encoding process comprises a modified 3D medical image feature downsampling process, the feature decoding process comprises a modified 3D medical image feature upsampling process, and the method further comprises:

before the performing image recognition, processing on an $I^{th}$-round modified 3D medical image feature obtained through $I^{th}$-round feature extraction to obtain an image recognition result of the 3D medical image; and determining, in a case that an upsampling result reaches an original size, the $i^{th}$ round modified 3D medical image feature obtained through extraction as the $I^{th}$-round modified 3D medical image feature obtained through $I^{th}$-round feature extraction.

12. The method according to claim 1, wherein the 3D medical image is a computed tomography (CT) image, a magnetic resonance imaging (MRI) image, or a positron emission tomography (PET) image.

13. A non-transitory computer-readable storage medium storing at least one instruction, at least one piece of program, a code set, or an instruction set, and the at least one instruction, wherein the at least one piece of program, the code set, or the instruction set is loaded and executed by a processor to implement the three-dimensional (3D) medical image recognition method according to claim 1.

14. An electronic device, comprising a memory for storing computer-readable instructions, and at least one processor configured to execute the computer-readable instructions to cause the electronic device to:

in a multi-round feature extraction iteration process:

perform, in an $i^{th}$-round feature extraction process, view rearrangement processing on an $(i-1)^{th}$-round modified 3D medical image feature to obtain two-dimensional (2D) image features, wherein different 2D image features are features of the $(i-1)^{th}$-round modified 3D medical image feature in different views, perform semantic feature extraction processing on each 2D image feature to obtain image semantic features in different views, and perform feature fusion processing on the image semantic features in different views to obtain an $i^{th}$-round modified 3D medical image feature; and perform image recognition processing on an $I^{th}$ round modified 3D medical image feature obtained through $I^{th}$-round feature extraction, to obtain an image recognition result of a 3D medical image, wherein i is a positive integer that increases in sequence, $1 < i \leq I$, I is a positive integer, and the modified 3D medical image feature in an initial round of the multi-round feature extraction iteration process is obtained by performing feature extraction on an initial 3D medical image feature, the initial 3D medical image feature being obtained by performing initial patch embedding on the 3D medical image.

* * * * *